US011496316B1

(12) United States Patent
Staskowski

(10) Patent No.: US 11,496,316 B1
(45) Date of Patent: Nov. 8, 2022

(54) SYSTEM AND METHOD FOR IDENTITY VERIFICATION FOR ONLINE DATING

(71) Applicant: Datesafe LLC, Red Lodge, MT (US)

(72) Inventor: Kaidan Staskowski, New York, NY (US)

(73) Assignee: Datesafe LLC, Red Lodge, MT (US)

( * ) Notice: Subject to any disclaimer, the term of this patent is extended or adjusted under 35 U.S.C. 154(b) by 0 days.

(21) Appl. No.: 17/865,798

(22) Filed: Jul. 15, 2022

(51) Int. Cl.
 *H04L 9/32* (2006.01)
 *H04L 9/00* (2022.01)
 *H04L 9/40* (2022.01)
 *G06Q 20/40* (2012.01)

(52) U.S. Cl.
 CPC ..... *H04L 9/3231* (2013.01); *G06Q 20/40145* (2013.01); *H04L 9/3247* (2013.01); *H04L 9/50* (2022.05); *H04L 63/0428* (2013.01)

(58) Field of Classification Search
 CPC ....... H04L 9/3231; H04L 9/3247; H04L 9/50; H04L 63/0428; G06Q 20/40145
 See application file for complete search history.

(56) References Cited

U.S. PATENT DOCUMENTS

| | | | |
|---|---|---|---|
| 7,246,067 B2 | 7/2007 | Austin et al. |
| 8,117,091 B2 | 2/2012 | Terrill et al. |
| 9,934,544 B1 | 4/2018 | Whitfield |
| 10,120,892 B2 | 11/2018 | Patterson et al. |
| 11,263,436 B1 | 3/2022 | Reinisch et al. |
| 2005/0027672 A1 | 2/2005 | Arndt et al. |
| 2007/0124226 A1 | 5/2007 | Garner, Jr. |
| 2014/0156750 A1 | 6/2014 | De Cristofaro et al. |
| 2014/0208411 A1 | 7/2014 | Austin et al. |
| 2017/0236230 A1 | 8/2017 | Thomas |
| 2019/0179516 A1 | 6/2019 | Rad et al. |

(Continued)

FOREIGN PATENT DOCUMENTS

| | | | | |
|---|---|---|---|---|
| CN | 107231331 B | * | 10/2020 | ............. H04L 29/06 |
| CN | 113487321 A | * | 10/2021 | ............. G06Q 20/40 |

(Continued)

OTHER PUBLICATIONS

Machine translation of description section of CN113672998A, published Feb. 18, 2022, p. 1-24.*

(Continued)

*Primary Examiner* — Christopher A Revak
(74) *Attorney, Agent, or Firm* — Mark Terry

(57) ABSTRACT

A system and method for facilitating online dating activities via identity verification over a communications network includes a client module on a client computing device, the client module configured for reading user contact information, taking a first image of the user's face, and taking a second image of the user's identification card via a camera on the client computing device, encrypting the data and transmitting it to the web server, receiving a verification of the user's identity from the web server and appending a digital signature to any transaction requests made to the web server. The system also includes a web server module executing on the web server configured for transmitting the user data to an identity authority, transmitting a verification of identity to the client computing device, encrypting the user data, and requiring that all transaction requests to the web server include a digital signature.

19 Claims, 4 Drawing Sheets

(56) References Cited

U.S. PATENT DOCUMENTS

| | | | |
|---|---|---|---|
| 2019/0325408 A1* | 10/2019 | Goroff | G06Q 20/3825 |
| 2021/0166130 A1* | 6/2021 | Neumann | G16H 40/67 |
| 2021/0176238 A1* | 6/2021 | Ports, III | H04W 12/77 |
| 2022/0094546 A1* | 3/2022 | Ying | H04W 12/06 |
| 2022/0150232 A1* | 5/2022 | Rappaport | H04L 63/08 |

FOREIGN PATENT DOCUMENTS

| | | | | |
|---|---|---|---|---|
| CN | 113672998 A * | 2/2022 | | G06Q 10/06 |
| WO | WO 2017/100929 A * | 6/2017 | | G06F 21/32 |

OTHER PUBLICATIONS

Machine translation of description section of CN113487321A, published Oct. 8, 2021, p. 1-26.*

Snippet of translated citation from CN107231331B, published Oct. 27, 2020, p. 1.*

* cited by examiner

SYSTEM AND METHOD FOR IDENTITY VERIFICATION FOR ONLINE DATING

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of electronic commerce and, more specifically, the claimed subject matter relates to the field of online dating activities using computing devices.

BACKGROUND

Online dating, otherwise known as Internet dating, is a system and process that enables people to find and introduce themselves to potential connections over the Internet, usually with the goal of developing personal, romantic, and/or sexual relationships. An online dating service is a company that provides specific mechanisms (generally mobile applications) for online dating through the use of Internet-connected personal computers or mobile devices. Such companies offer a wide variety of unmoderated matchmaking services, most of which are profile-based. Online dating services allow users to create a profile and upload personal information including age, gender, sexual orientation, location, and appearance, as well as photos and videos. Once a profile has been created, members can view the profiles of other members of the service, using the visible profile information to decide whether or not to initiate contact. Most services offer digital messaging, while others provide additional services such as webcasts, online chat, telephone chat, and message boards. Members can constrain their interactions to the online space, or they can arrange a date to meet in person.

A great diversity of online dating services currently exists. Some have a broad membership base of diverse users looking for many different types of relationships. Other sites target highly specific demographics based on features like shared interests, location, religion, sexual orientation or relationship type. Online dating services also differ widely in their revenue streams. Some sites are completely free and depend on advertising for revenue. Others utilize the freemium revenue model, offering free registration and use, with optional, paid, premium services. Still others rely solely on paid membership subscriptions.

One of the drawbacks associated with conventional online dating activities involves identity verification. Conventionally, a user creates a profile using photos and his contact information, but there is often no way to insure that the user is utilizing photos of himself or herself and that the contact information he or she input is correct. This provides cover for scammers or other bad actors who intend to "catfish" other users, scam other users or simply waste the time of others. This is a disadvantage to users who intend to make connections with other real people with the goal of developing relationships.

Therefore, what is needed is a system and method for improving the problems with the prior art, and more particularly for a more expedient and efficient method and system for facilitating online dating activities via identity verification.

BRIEF SUMMARY

In one embodiment, a system and method for facilitating online dating activities via identity verification over a communications network is disclosed. The system includes a client module executing on a client computing device communicably connected to a communications network, the client module configured for: receiving from a web server, over the communications network, a private key, reading user contact information entered via the client computing device, taking a first image of the user's face, and taking a second image of the user's identification card via a camera on the client computing device, encrypting the user contact information and the first and second images into an encrypted data packet using the private key, and transmitting the encrypted data packet to the web server over the communications network, receiving from the web server, over the communications network, a verification of the user's identity; and appending a digital signature to any transaction requests made to the web server over the communications network, wherein the digital signature is made using the private key. The system also includes a web server module executing on the web server communicably connected to the communications network, the web server module configured for transmitting the private key to the client computing device over the communications network, and storing a public key corresponding to the private key in a user profile in a database, receiving the encrypted data packet from the client computing device, over the communications network, and decrypting the encrypted data packet using the public key, transmitting, to an identity authority over the communications network, a request to verify the identity of the user, wherein the request includes the user contact information, the first and second images in the encrypted data packet that was decrypted, receiving, from the identity authority over the communications network, a verification of identity of the user, transmitting a verification of identity to the client computing device, over the communications network, encrypting the user contact information and the first and second images into a subsequent encrypted data packet using the private key, and storing the subsequent encrypted data packet in the user profile in the database, editing user permission in the user profile to permit the user to make transaction requests to the web server, and, requiring that all transaction requests to the web server from the client computing device include a digital signature using the private key.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
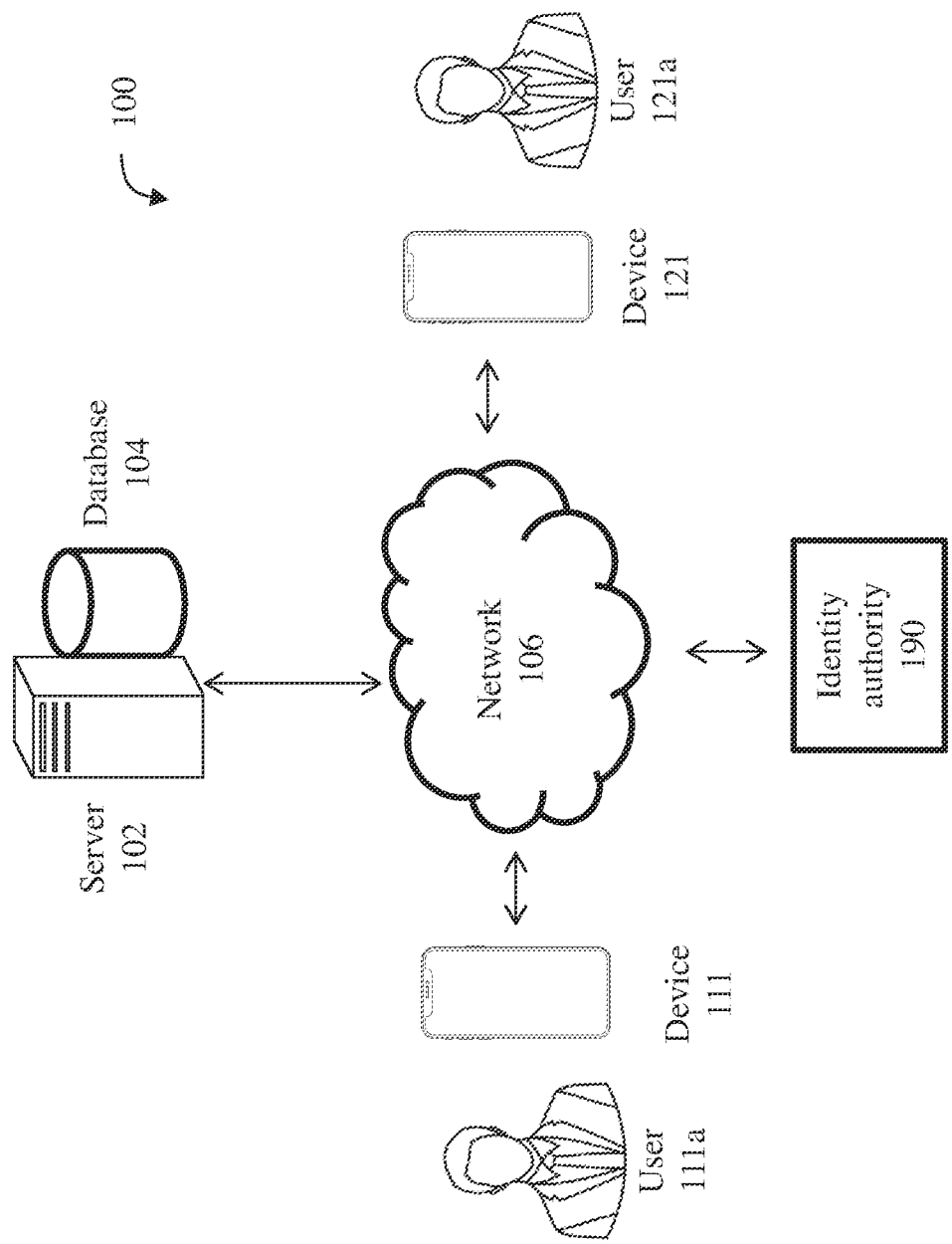
FIG. 1 is a block diagram illustrating the network architecture of a system for facilitating online dating activities via identity verification over a communications network, in accordance with one embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments improve upon the problems with the prior art by providing a system that allows facilitate online dating activities by verifying the identity of users using a new identity authority. Each user is required to enter contact information as well as a facial scan and a user identification card so that his or her identity may be verified against an identity authority, such as a governmental driver's license database. Therefore, the disclosed embodiments reduce or eliminate the possibility that a scammer, a "catfisher" or a bad actor can hide or obscure his actual identity while using an online dating application. This is advantageous for users and their friends or acquaintances, as it provides greater accuracy in ensuring that users of an online dating application are who they say they are. An additional benefit of the disclosed embodiments is the immediate transmission of user identify verification to the user's mobile device, which allows the recipient to immediately start using the online dating application. The main benefit of the claimed subject matter is the improvement of the conventional online dating experience by insuring user identity, which results in more security and fewer mishaps or negative experiences relating to false identities. That is, when users are sure they are speaking to actual, verified users, they can better enjoy the online dating experience. The claimed subject matter also allows for safer and more secure communications and dating in general.

Referring now to the drawing figures in which like reference designators refer to like elements, there is shown in FIG. 1 an illustration of a block diagram showing the network architecture of a system 100 and method for facilitating online dating activities via identity verification over a communications network in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, facilitating online dating activities via identity verification of users.

FIG. 1 includes mobile computing devices 111, 121, which may be smart phones, mobile phones, tablet computers, handheld computers, laptops, or the like. In another embodiment, mobile computing devices 111, 121, are workstations, desktop computers, servers, laptops, all-in-one computers, or the like. In another embodiment, mobile computing devices 111, 121, are AR or VR systems that may include display screens, headsets, heads up displays, helmet mounted display screens, tracking devices, or the like. Mobile computing device 111 corresponds to a user 111a interested in online dating activities. Mobile computing device 121 corresponds to a user 121a interested in online dating activities. Devices 111, 121 may be communicatively coupled with network 106 in a wired or wireless fashion. Augmented reality (AR) adds digital elements to a live view often by using a camera on a computing device. Virtual reality (VR) is a complete or near complete immersion experience that replaces the physical world.

FIG. 1 further shows that server 102 includes a database or repository 104, which may be a relational database comprising a Structured Query Language (SQL) database stored in a SQL server. Devices 111, 121 may also each include their own database. The repository 104 serves data from a database, which is a repository for data used by server 102 and devices 111, 121 during the course of operation of the disclosed embodiments. Database 104 may be distributed over one or more nodes or locations that are connected via network 106.

The database 104 may include a user record for each user 111a or 121a. A user record may include: contact/identifying information for the user (name, address, telephone number(s), email address, etc.), information pertaining to other users associated with the user (such as dating partners), electronic payment information for the user, information pertaining to the communications made by the user, sales transaction data associated with the user, etc. A user record may also include a unique identifier for each user, a residential address for each user, the current location of each user (based on location-based services from the user's mobile computer) and a description of past online dating services purchased by each user. A user record may further include demographic data for each user, such as age, sex, income data, race, color, marital status, etc. A user record may also include dating preferences of the user.

Sales transaction data may include one or more product/service identifiers (such as SKUs), one or more product/service amounts, buyer contact/identifying information, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

The database 104 may include a user profile record for each user. A user profile may include any of the data associated with a user record above. A user profile may also include user contact information entered via the client computing device, a first image of the user's face and a second image of the user's identification card taken via a camera on the client computing device. A user profile may also include a private key, a corresponding public key, an indicator as to whether the user's identity has been verified by the identity authority, and a user permission regarding whether the user may make transaction requests to the web server.

The database 104 may be used to store a blockchain that includes user profile records. A blockchain is a growing list of records, called blocks, that are securely linked together using cryptography. Each block contains a cryptographic hash of the previous block, a timestamp, and transaction data (which may be generally represented as a Merkle tree, where data nodes are represented by leafs). The timestamp proves that the transaction data existed when the block was published to get into its hash. As blocks each contain information about the block previous to it, they form a chain, with each additional block reinforcing the ones before it. The blockchain may be a decentralized, distributed, and oftentimes public, digital ledger consisting of user profile records called blocks that are used to record transactions across many computers so that any involved block cannot be altered retroactively, without the alteration of all subsequent blocks. This allows the participants to verify and audit transactions independently and relatively inexpensively. The blockchain database may be managed autonomously using a peer-to-peer network and a distributed timestamping server. For this reason, the database 104 may be a distributed database distributed over many computers of many users.

Blocks of the blockchain hold batches of valid transactions that may be hashed and encoded into a Merkle tree. Each block includes the cryptographic hash of the prior block in the blockchain, linking the two. The linked blocks form a chain. This iterative process confirms the integrity of the previous block, all the way back to the initial block. To assure the integrity of a block and the data contained in it, the block may be digitally signed.

FIG. 1 shows an embodiment wherein networked computing devices 111, 121 interact with server 102 and repository 104 over the network 106. It should be noted that although FIG. 1 shows only the networked computers 111, 121 and 102, the system of the disclosed embodiments supports any number of networked computing devices connected via network 106. Further, server 102, and units 111, 121 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 111, 121. Further, server 102 and its functionality, according to a preferred embodiment, can be realized in a centralized fashion in one computer system or in a distributed fashion wherein different elements are spread across several interconnected computer systems.

FIG. 1 also shows an identity authority 190, coupled with network 106. The identity authority 190 may comprise one or more entities, such as one or more governmental entities, which includes a database from which a user's age maybe calculated. For example, the age authority may comprise a database of user identifying information that includes ages and dates of birth. Said database may be checked to determine whether or not a user has an age that is at or above a predefined threshold. Said database may be checked to determine whether or not the information provided by a user matches the data that is stored in the database. In one example, the identity authority 190 includes a driver's license database that can be checked to the verify the identity of a user. In one example, the identity authority 190 includes a national sex offender database that can be checked to the verify the identity of a user. Any user whose identity is found in a national sex offender database will not have his identity verified and will be rejected from using the mobile application.

FIG. 1 may also include a payment authority, which acts to effectuate payments by users for online dating services. In the course of a sales transaction, server 102 may interface with the payment authority to effectuate payment. In one embodiment, the payment authority is a payment gateway, which is an e-commerce Application Service Provider (ASP) service that authorizes and processes payments from one party to another. The payment authority may accept payment via the use of purchase cards, i.e., credit cards, charge cards, bank cards, gift cards, account cards, etc.

Figure 2:
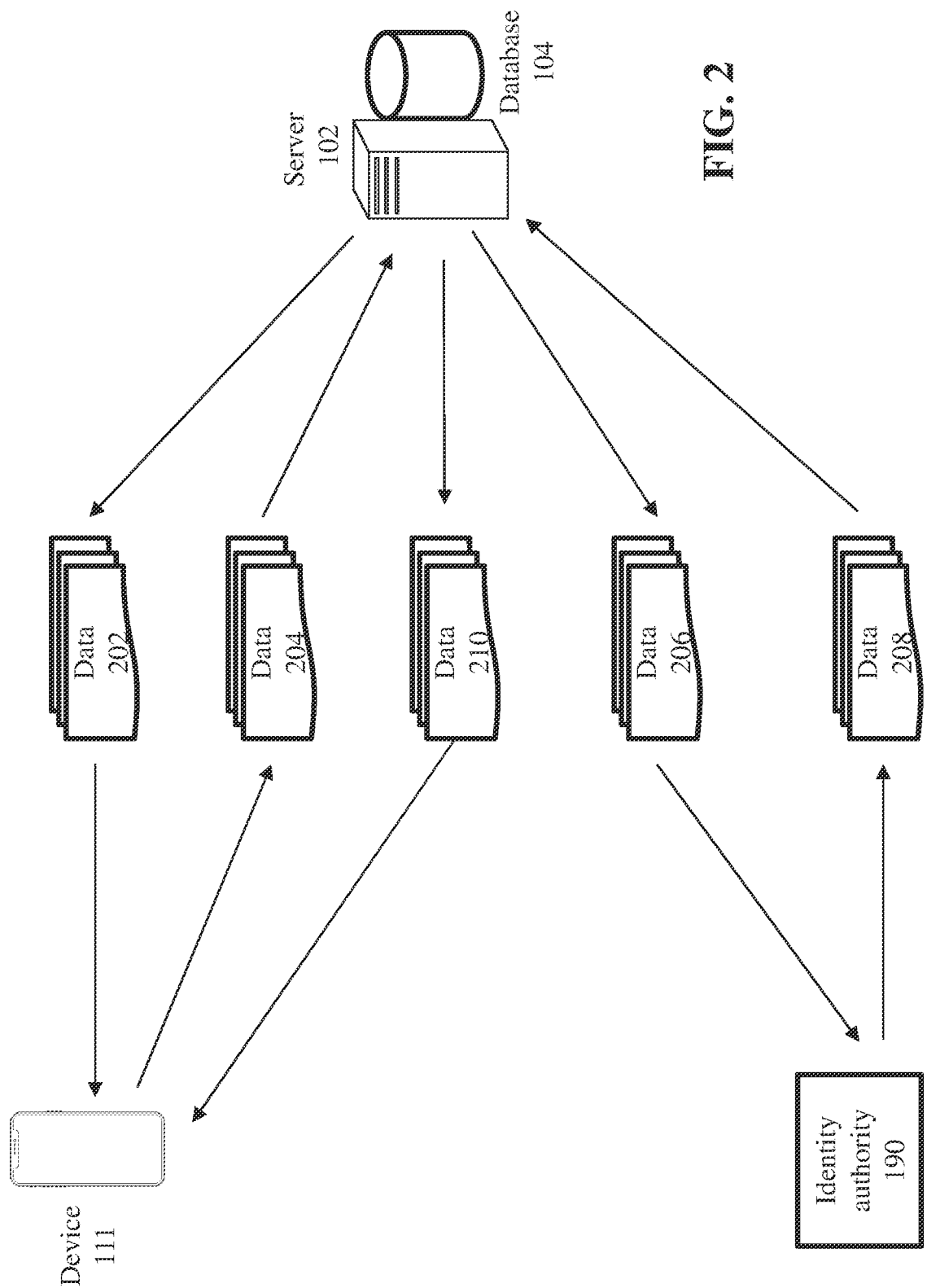
FIG. 2 is a block diagram showing the data flow of the process for facilitating online dating activities via identity verification over a communications network, according to one embodiment.
Figure 3:
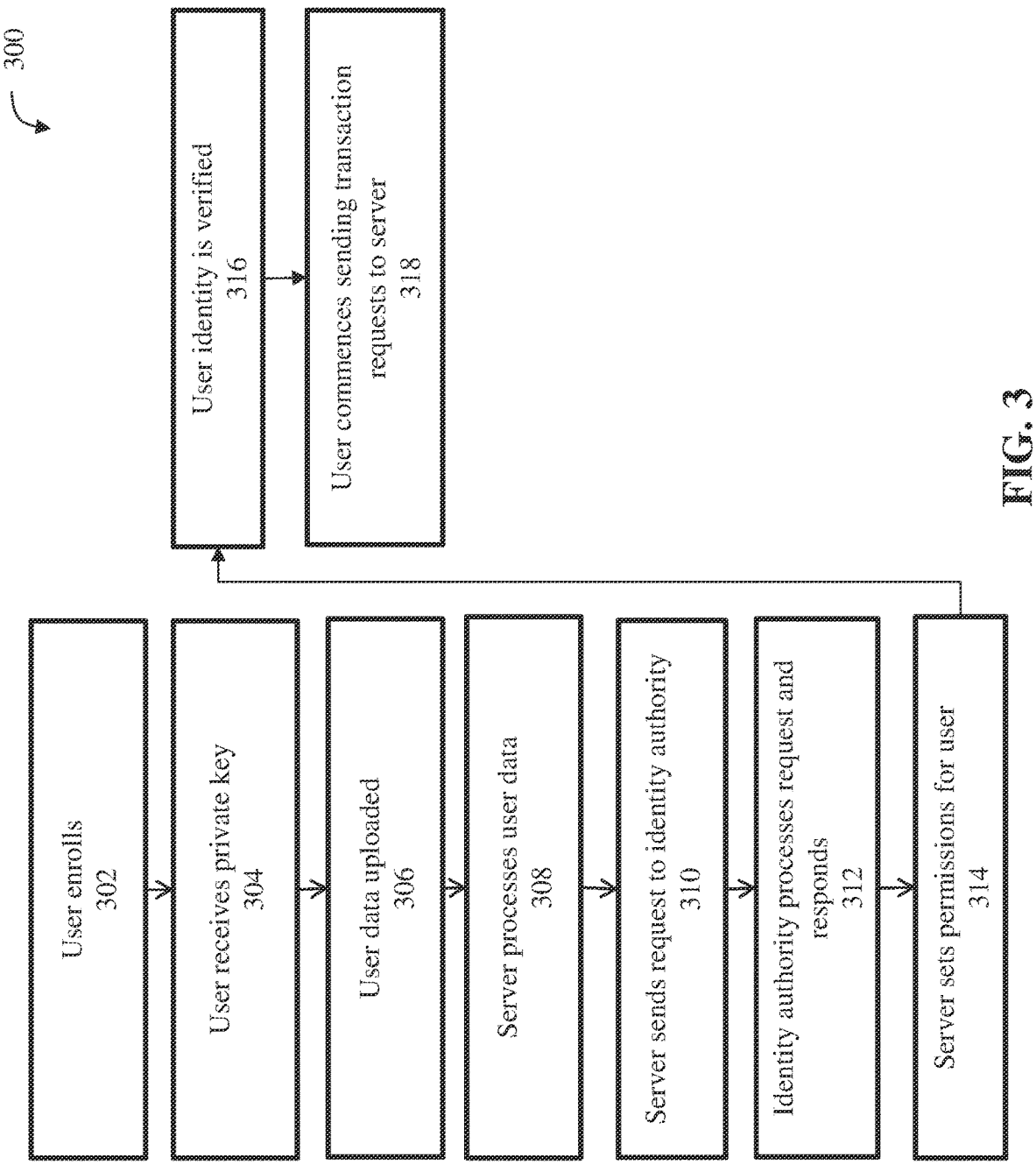
FIG. 3 is a flow chart depicting the general control flow of a process for facilitating online dating activities via identity verification over a communications network, according to one embodiment.

The process of facilitating online dating activities via identity verification over a communications network will now be described with reference to FIGS. 2-3 below. FIGS. 2-3 depict the data flow and control flow of the process for facilitating online dating activities via identity verification over a communications network 106, according to one embodiment. The process of the disclosed embodiments begins with optional step 302 (see flowchart 300), wherein the user 111a may enroll or register with server 102. In the course of enrolling or registering, the user may enter data into their device 111a by manually entering data into a mobile application (i.e., a client module executing on the computing device 111) via keypad, touchpad, or via voice. In the course of enrolling or registering, the user may enter any data that may be stored in a user record, as defined above. Preferably, the user enters at least the following information into the mobile device: user contact information, a first image of the user's face (taken using the camera on the device 111), a second image of the user's identification card (taken using the camera on the device 111).

Subsequently, in step 304, the server 102 transmits, such as via an HTTP request, a private key (via data packet 202) to the device 111 of user 111a via the network 106. The device 111 of user 111a receives said private key and utilizes it to encrypt the data entered by the user, namely, user contact information, a first image of the user's face, a second image of the user's identification card. The encrypting step results in an encrypted data packet. In step 306, the client module is configured for transmitting said encrypted data packet (via data packet 204), such as via an HTTP request, to server 102 for identity verification.

In step 306, the step of taking a second image of the user's identification card via a camera on the client computing device further comprises processing said second image to identify a name and a date of birth within said second image. Additionally, said step may further comprise processing said second image to identify barcodes on the back of the identification card, as well as birthdates, images, age, and names.

In step 308, the server processes the encrypted data packet by unencrypting the data packet using a public key that corresponds to the private key that was sent to the client earlier. Also in the course of this step, the server 102 may generate a user record and a user profile record for the registering user and store the user record and user profile record in an attached database, such as database 104.

In step 310, the user contact information, a first image of the user's face, and a second image of the user's identification card presented by the user 111 is transmitted (via data packet 206), via network 106, by server 102 to identity authority 190 for processing. In this step, the server sends a request (206) to the identity authority to verify the identity of the user, wherein the request includes the user contact information, the first and second images in the encrypted data packet that was decrypted. Step 310 may be performed using an Application Programming Interface (API) to communicate with identity authority 190.

In step 312, identity authority 190 processes the user data and verifies whether the user's identity can be verified. If so, the identity authority 190 may send a verification message 208 to the server 102 thereby verifying that the user's identity has been verified.

In step 312, the identity authority 190 may use the user contact information (such as name, date of birth and address) to look up its records to identity a user identification record that matches the data in the user contact information. If the identify authority finds a user identification record that matches the data in the user contact information, then the identity authority verifies the user's identity. In step 312, the identity authority 190 may also use the first image of the user's face to look up its records to identity a user identification record with a facial image that matches the first image of the user's face. If the identify authority finds a user identification record with a facial image that matches the first image of the user's face, then the identity authority verifies the user's identity. In step 312, the identity authority 190 may also use the second image of the user's identification card to look up its records to identity a user identification record with user contact information and a facial image that matches the user information in the identification card and the facial image of the in the identification card. If the identify authority finds a user identification record with a facial image and user information that matches the image of the user's face and the user contact information in the identification card, then the identity authority verifies the user's identity. In one embodiment, the identity authority checks all of the user contact information, the first image, the second image, the image of the user's face and the user contact information in the identification card, to determine whether it will verify the user's identity.

In one embodiment, the identity authority may use computer vision technology to analyze physical attributes, for example, comparing the eyes, open or closed, hair color, mood, skin color, nose size, and visual geometry of the face, to compare images.

In the next step 314, the server 102 may set a permission in the user profile to allow the user to engage in additional transactions requests with the server, provided that all transaction requests must include a digital signature signed using the private key corresponding to the user 111. Also in step 314, the server 102 may encrypt the user contact information, the first image and the second image into an encrypted data packet and store the encrypted data packet in the user profile in database 104 (or in the blockchain in the database 104), along with the private key and the public key corresponding to the user. In one embodiment of step 314, the subsequent encrypted data packet stored in the user profile in the blockchain further comprises including a cryptographic hash of a previous block, a timestamp, and transaction data in the encrypted data packet that is stored in the blockchain.

In 316, the server 102 may transmit the user identify verification (via data packet 210) to the mobile device 111 of the user 111a via a network protocol, such as HTTP, to the IP address of the mobile device 112, as the IP address is stored in the user record(s) associated with the user or via text message to the telephone number of the mobile device 111, as the telephone number is stored in the user record(s) associated with the user. Once it has received the verification of identity from the server, the client module executing on mobile computing device 111 may display a message indicating that the user's identity has been verified. Once it has received the verification of identity from the server, the client module executing on mobile computing device 111 may proceed to perform additional transactions with the server 102, with the requirement that all transaction requests must include a digital signature signed using the private key corresponding to the user 111.

In step 318, the user 111 may interact with the client module executing on mobile computing device 11 to order or perform additional transaction requests with the server 102. In this step, the server 102 requires that all transaction requests from the user 111 must include a digital signature signed using the private key corresponding to the user 111. Therefore, when the user 111 makes any transaction requests to the server, said request includes a digital signature signed using the private key corresponding to the user 111. As of step 318 and for all transaction requests in the future made by user 111, the server 102 must read the digital signature attached to the request and use the public key corresponding to the user 111 to unencrypt said transaction requests to insure that said request is originating from the user 111. If the server 102 receives any transaction requests form the user 111 that lack a digital signature, or with a digital signature that cannot be unencrypted using the public key corresponding to the user 111, said transaction requests is denied or will remain unanswered.

Transaction requests made to the server 102 include any requests to perform transactions with the server for an online dating activity mobile application. This includes requests to browse other use profiles, requests to contact other users, requests to make profiles or edit profiles, requests to engage with other users or requests to make social media posts.

In one embodiment, any requests, messages or other data sent by the client computing module or the web server module via network 106 may be done via HTTP request. Public-key cryptography, or asymmetric cryptography, is a cryptographic system that uses pairs of keys. Each pair consists of a public key (which may be known to others) and a private key (which may not be known by anyone except the owner). The generation of such key pairs depends on cryptographic algorithms which are based on mathematical problems termed one-way functions. Effective security requires keeping the private key private; the public key can be openly distributed without compromising security. In such a system, anyone can encrypt a message using the receiver's public key, but that encrypted message can only be decrypted with the receiver's private key. This allows, for instance, a server program to generate a cryptographic key intended for a suitable symmetric-key cryptography, then to use a client's openly shared public key to encrypt that newly generated symmetric key. The server can then send this encrypted symmetric key over an insecure channel to the client; only the client can decrypt it using the client's private key (which pairs with the public key used by the server to encrypt the message). With the client and server both having the same symmetric key, they can safely use symmetric key encryption (likely much faster) to communicate over otherwise-insecure channels. This scheme has the advantage of not having to manually pre-share symmetric keys (a fundamentally difficult problem) while gaining the higher data throughput advantage of symmetric-key cryptography.

A digital signature is a mathematical scheme for verifying the authenticity of digital messages or documents. A valid digital signature, where the prerequisites are satisfied, gives a recipient very high confidence that the message was created by a known sender (authenticity), and that the message was not altered in transit (integrity). Digital signatures employ asymmetric cryptography. They provide a layer of validation and security to messages sent through a non-secure channel. Properly implemented, a digital signature gives the receiver reason to believe the message was sent by the claimed sender. A digital signature scheme typically consists of three algorithms: a key generation algorithm that selects a private key uniformly at random from a set of possible private keys, wherein the algorithm outputs the private key and a corresponding public key, a signing algorithm that, given a message and a private key, produces a signature, and a signature verifying algorithm that, given the message, public key and signature, either accepts or rejects the message's claim to authenticity. The authenticity of a signature generated from a fixed message and fixed private key can be verified by using the corresponding public key. Also, it should be computationally infeasible to generate a valid signature for a party without knowing that party's private key. A digital signature is an authentication mechanism that enables the creator of the message to attach a code that acts as a signature. The Digital Signature Algorithm (DSA), developed by the National Institute of Standards and Technology, is one of many examples of a signing algorithm.

A cryptographic hash function, a basic tool of modern cryptography, is a mathematical algorithm that maps data of an arbitrary size (often called the "message") to a bit array of a fixed size (the "hash value", "hash", or "message digest"). It is a one-way function, that is, a function for which it is practically infeasible to invert or reverse the computation. A cryptographic hash function must be deterministic, quick to compute the hash value for any given message, be infeasible to generate a message that yields a given hash value, be infeasible to find two different messages with the same hash value, and exhibit that a small change to a message should change the hash value so extensively that a new hash value appears uncorrelated with the old hash value. Cryptographic hash functions may be used in digital signatures. Digital signature schemes require a cryptographic hash to be calculated over the message. This allows the signature calculation to be performed on the relatively small, statically sized hash digest. The message is considered authentic if the signature verification succeeds given the signature and recalculated hash digest over the message. The message integrity property of the cryptographic hash is used to create secure and efficient digital signature schemes.

Figure 4:
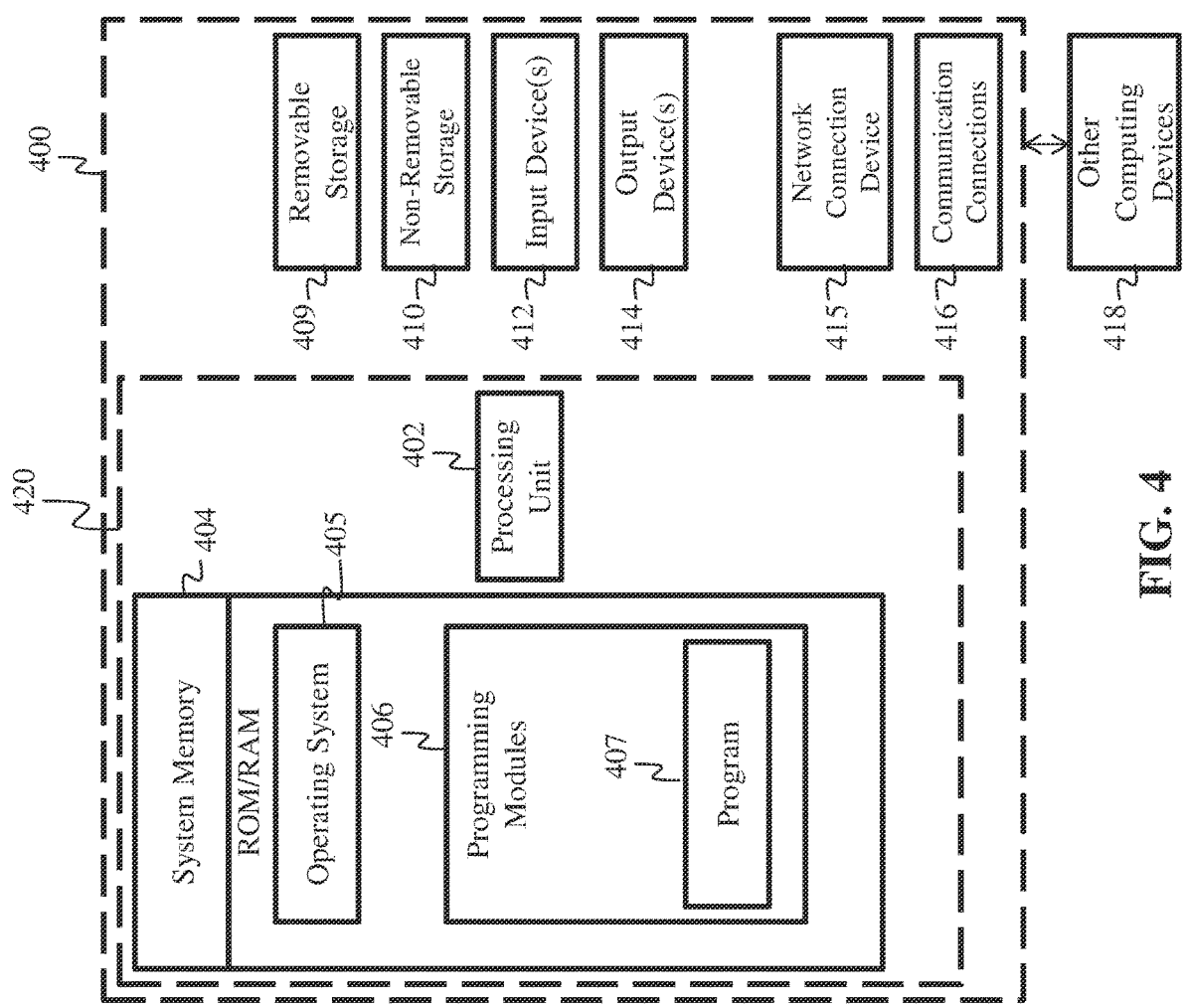
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 111, 121, 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process 300, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 111, 121, 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for facilitating online dating activities via identity verification, the system comprising:
   a) a client module executing on a client computing device communicably connected to a communications network, the client module configured for:
      1) Receiving from a web server, over the communications network, a private key;
      2) Reading user contact information entered via the client computing device, taking a first image of the user's face, and taking a second image of the user's identification card via a camera on the client computing device;
      3) Encrypting the user contact information and the first and second images into an encrypted data packet using the private key, and transmitting the encrypted data packet to the web server over the communications network;
      4) Receiving from the web server, over the communications network, a verification of the user's identity; and
      5) Appending a digital signature to any transaction requests made to the web server over the communications network, wherein the digital signature is made using the private key;
   b) a web server module executing on the web server communicably connected to the communications network, the web server module configured for:
      1) Transmitting the private key to the client computing device over the communications network, and storing a public key corresponding to the private key in a user profile in a blockchain;

2) Receiving the encrypted data packet from the client computing device, over the communications network, and decrypting the encrypted data packet using the public key;
3) Transmitting, to an identity authority over the communications network, a request to verify the identity of the user, wherein the request includes the user contact information, the first and second images in the encrypted data packet that was decrypted;
4) Receiving, from the identity authority over the communications network, a verification of identity of the user;
5) Transmitting a verification of identity to the client computing device, over the communications network;
6) Encrypting the user contact information and the first and second images into a subsequent encrypted data packet using the private key, and storing the subsequent encrypted data packet in the user profile in the blockchain;
7) Editing user permission in the user profile to permit the user to make transaction requests to the web server; and
8) Requiring that all transaction requests to the web server from the client computing device include a digital signature using the private key.

2. The system of claim 1, further comprising a database communicably connected to the communications network, the database configured for storing the blockchain, wherein said blockchain includes user profiles, wherein each user profile comprises user permissions, user contact information, a first image of a user's face, a second image of a user's identification card, a public key, and a private key corresponding to the public key.

3. The system of claim 2, wherein the step of receiving from the web server the private key further comprises receiving the private key via an HTTP request from the web server.

4. The system of claim 3, wherein the step of transmitting the encrypted data packet to the web server further comprises transmitting the encrypted data packet to the web server via an HTTP request to the web server.

5. The system of claim 4, wherein the step of receiving from the web server a verification of the user's identity further comprises receiving the verification of the user's identity via an HTTP request from the web server.

6. The system of claim 5, wherein the step of transmitting the private key to the client computing device further comprises transmitting the private key to the client computing device via an HTTP request to the client computing device.

7. The system of claim 4, wherein the step of receiving the encrypted data packet from the client computing device further comprises receiving the encrypted data packet via an HTTP request from the client computing device.

8. The system of claim 7, wherein the step of transmitting the verification of identity to the client computing device further comprises transmitting the verification of identity to the client computing device via an HTTP request to the client computing device.

9. The system of claim 8, wherein the step of taking a second image of the user's identification card via a camera on the client computing device further comprises processing said second image to identify a name and a date of birth within said second image.

10. The system of claim 9, wherein the step of encrypting the user contact information and the first and second images into a subsequent encrypted data packet using the private key, and storing the subsequent encrypted data packet in the user profile in the blockchain further comprises including a cryptographic hash of a previous block, a timestamp, and transaction data in the encrypted data packet that is stored in the blockchain.

11. A method for facilitating online dating activities via identity verification, the method comprising:
1) Receiving, on a client module executing on a client computing device communicably connected to a communications network, from a web server over the communications network, a private key;
2) Reading, on the client module, user contact information entered via the client computing device, taking a first image of the user's face, and taking a second image of the user's identification card via a camera on the client computing device;
3) Encrypting, on the client module, the user contact information and the first and second images into an encrypted data packet using the private key, and transmitting the encrypted data packet to the web server over the communications network;
4) Receiving, on the client module, from the web server over the communications network, a verification of the user's identity; and
5) Appending, on the client module, a digital signature to any transaction requests made to the web server over the communications network, wherein the digital signature is made using the private key;
6) Transmitting, by a web server module executing on the web server communicably connected to the communications network, the private key to the client computing device over the communications network, and storing a public key corresponding to the private key in a user profile in a database;
7) Receiving, by the web server module, the encrypted data packet from the client computing device, over the communications network, and decrypting the encrypted data packet using the public key;
8) Transmitting, by the web server module, to an identity authority over the communications network, a request to verify the identity of the user, wherein the request includes the user contact information, the first and second images in the encrypted data packet that was decrypted;
9) Receiving, by the web server module, from the identity authority over the communications network, a verification of identity of the user;
10) Transmitting, by the web server module, a verification of identity to the client computing device, over the communications network;
11) Encrypting, by the web server module, the user contact information and the first and second images into a subsequent encrypted data packet using the private key, and storing the subsequent encrypted data packet in the user profile in the database;
12) Editing, by the web server module, user permission in the user profile to permit the user to make transaction requests to the web server; and
13) Requiring, by the web server module, that all transaction requests to the web server from the client computing device include a digital signature using the private key.

12. The method of claim 11, wherein a database, communicably connected to the communications network, is configured for storing user profiles, wherein each user profile comprises user permissions, user contact information, a first image of a user's face, a second image of a user's identification card, a public key, and a private key corresponding to the public key.

13. The method of claim 12, wherein the step of receiving from the web server the private key further comprises receiving the private key via an HTTP request from the web server.

14. The method of claim 13, wherein the step of transmitting the encrypted data packet to the web server further comprises transmitting the encrypted data packet to the web server via an HTTP request to the web server.

15. The method of claim 14, wherein the step of receiving from the web server a verification of the user's identity further comprises receiving the verification of the user's identity via an HTTP request from the web server.

16. The method of claim 15, wherein the step of transmitting the private key to the client computing device further comprises transmitting the private key to the client computing device via an HTTP request to the client computing device.

17. The method of claim 14, wherein the step of receiving the encrypted data packet from the client computing device further comprises receiving the encrypted data packet via an HTTP request from the client computing device.

18. The method of claim 17, wherein the step of transmitting the verification of identity to the client computing device further comprises transmitting the verification of identity to the client computing device via an HTTP request to the client computing device.

19. The method of claim 18, wherein the step of taking a second image of the user's identification card via a camera on the client computing device further comprises processing said second image to identify a name and a date of birth within said second image.

* * * * *

UNITED STATES PATENT AND TRADEMARK OFFICE
CERTIFICATE OF CORRECTION

| | |
|---|---|
| PATENT NO. | : 11,496,316 B1 |
| APPLICATION NO. | : 17/865798 |
| DATED | : November 8, 2022 |
| INVENTOR(S) | : Kaidan Staskowski et al. |

It is certified that error appears in the above-identified patent and that said Letters Patent is hereby corrected as shown below:

On the Title Page

Item (12) "Staskowski" should read -- Staskowski et al. --.

Item (72) should be corrected to read -- Inventor: Kaidan Staskowksi, New York, New York; Harlan Auerbach, New York, New York; Darrin Frank, West New York, New Jersey --.

Signed and Sealed this
Ninth Day of May, 2023

Katherine Kelly Vidal
*Director of the United States Patent and Trademark Office*